United States Patent
Park et al.

(10) Patent No.: US 7,767,101 B2
(45) Date of Patent: Aug. 3, 2010

(54) METHOD FOR FABRICATING PROBE FOR USE IN SCANNING PROBE MICROSCOPE

(75) Inventors: Young Geun Park, Suwon-si (KR); Hee Ok Jang, Seoul (KR)

(73) Assignee: M2N Inc., Yongin-Si, Gyeonggi-Do (KR)

( * ) Notice: Subject to any disclaimer, the term of this patent is extended or adjusted under 35 U.S.C. 154(b) by 608 days.

(21) Appl. No.: 11/753,248

(22) Filed: May 24, 2007

(65) Prior Publication Data

US 2008/0272087 A1      Nov. 6, 2008

(30) Foreign Application Priority Data

May 2, 2007      (KR) ....................... 10-2007-0042629

(51) Int. Cl.
 *C25F 3/00*      (2006.01)
(52) U.S. Cl. ............................... 216/11; 216/2; 216/24; 216/41; 216/99

(58) Field of Classification Search ................... 216/11, 216/2, 24, 41, 99
See application file for complete search history.

(56) References Cited

U.S. PATENT DOCUMENTS

2006/0073627 A1 *   4/2006   Park et al. ..................... 438/52

FOREIGN PATENT DOCUMENTS

JP         2001242061         9/2001

* cited by examiner

*Primary Examiner*—Roberts Culbert
(74) *Attorney, Agent, or Firm*—Pearne & Gordon LLP

(57) ABSTRACT

A method of fabricating a probe tip for use in a scanning probe microscope, includes the steps of: forming a triangular prism provided with a passivation film by patterning a {111} general silicon wafer, the passivation film being deposited on two sidewalls of the triangular prism; etching the silicon wafer to make the triangular prism into a probe tip of a triangular pyramid shape; and removing the passivation film.

14 Claims, 15 Drawing Sheets

METHOD FOR FABRICATING PROBE FOR USE IN SCANNING PROBE MICROSCOPE

FIELD OF THE INVENTION

The present invention relates to a method for fabricating a probe for use in a scanning probe microscope; and, more particularly, to a method for fabricating a probe for use in a scanning probe microscope by using a {111} single-crystalline silicon.

BACKGROUND OF THE INVENTION

A scanning probe microscope (SPM) operates by scanning a surface of a sample with a probe, wherein the probe generally includes a probe body, a cantilever connected to the probe body and a probe tip attached to one end of the cantilever.

FIG. 1 shows an example operation of an SPM. As illustrated in FIG. 1, if a probe tip 110 attached to a cantilever 120 scans a surface of a sample 130, an interaction between the probe tip 110 and the sample 130 is detected and, further, the detected result is converted into an image.

Specifically, a laser beam generated from a light source 150 is irradiated on an upper surface of the cantilever 120. Then, if the probe tip 110 vertically moves along a bent of the surface of the sample 130, a reflection angle between a laser beam irradiated on the upper surface of the cantilever 120 and a laser beam reflected from the surface of the sample 130 becomes changed.

Accordingly, a position-sensitive detector 140 located in a moving direction of the reflected laser beam detects a movement of the reflected laser beam and, then, the detected result is converted into an image.

A performance of the above-described SPM depends greatly on characteristics of the probe tip 110. The characteristics of the probe tip 110 can be evaluated in terms of a height, an apex radius of the probe tip, an aspect ratio of the probe tip or the like.

Especially, the aspect ratio of the probe tip is a critical feature to determine a detection resolution of the SPM.

FIG. 2A shows an example of a probe tip 110 having a small aspect ratio, and FIG. 2B provides an example of a probe tip 110 having a large aspect ratio.

As shown in FIG. 2A, if a right-angled bent of the surface of the sample 130 is scanned by the probe tip 110 having the small aspect ratio and, then, the result thereof is converted into an image, the bent of the surface of the sample 130 cannot be precisely visualized.

On the other hand, as illustrated in FIG. 2B, if a right-angled bent of the surface of the sample 130 is scanned by the probe tip 110 having the large aspect ratio and, then, the result thereof is converted into an image, the bent of the surface of the sample 130 can be much more precisely visualized.

That is, a larger aspect ratio of the probe tip 110 enables a more precise visualization of the bent of the surface of the sample 130.

Meanwhile, as disclosed in U.S. Pat. No. 5,021,364, most of the conventional probe tips have been fabricated by a wet etching process or an isotropic dry etching process on a {100} crystal face of a {100} single-crystalline silicon. However, if such processes are employed, it is difficult to obtain a silicon probe tip of a large aspect ratio at a crystallographic point.

FIG. 3A offers a drawing of a probe tip fabricated by using the {100} single-crystalline silicon disclosed in U.S. Pat. No. 5,021,364. As shown in FIG. 3A, if the probe tip is fabricated by using the {100} single-crystalline silicon, an angle of just 54.7° is crystallographically formed by the {100} surface of the cantilever and a {111} surface of the probe tip.

Meanwhile, FIG. 3B shows a probe tip fabricated by using a {111} single-crystalline silicon in accordance with an embodiment of the present invention. Referring to FIG. 3B, if the probe tip is fabricated by using the {111} single-crystalline silicon, an angle of 70.5° is crystallographically formed by a {111} surface of the cantilever and a {111} surface of the probe tip. Accordingly, it is possible that the probe tip having a relatively larger aspect ratio is fabricated by using the {111} single-crystalline silicon in comparison with using the {100} single-crystalline silicon. Detailed description will be followed with reference to FIGS. 3C and 3D.

FIG. 3C is a diagram showing a crystal orientation of a silicon wafer; and FIG. 3D illustrates a cross sectional view of a crystal face taken along a line A-B of FIG. 3C. As shown in FIGS. 3C and 3D, if an orientation of a flat zone of a silicon wafer is set to be a [1-10] direction, an angle formed by another {111} silicon crystal face and a wafer surface becomes 19.5°. In accordance with the embodiments of the present invention, a probe tip having a large aspect ratio can be fabricated by forming the above-described {111} surface as an inclined surface of the probe tip.

Further, as disclosed in U.S. Pat. No. 5,021,364, a method for fabricating a cantilever by using the {100} silicon wafer includes a step of forming a P-N junction after doping impurity on the silicon wafer and a step of performing an etch stop process after carrying out a wet etching process on the silicon wafer with a electrochemical manner.

Moreover, another method for fabricating a cantilever by using the {100} silicon wafer is a method of using a silicon on insulator (SOI) wafer, as disclosed in U.S. Pat. No. 5,811,017. The SOI wafer is formed by bonding two wafers with an insulator film, and the SOI wafer has been widely used because the insulator functions as an etch stop layer in fabricating the cantilever.

Since the SOI wafer is much more expensive than a general silicon wafer ten times or more, manufacturing cost is increased if a probe is fabricated by using the SOI wafer.

Furthermore, if the SOI wafer is used, a thickness of the cantilever of the probe is determined by a thickness of a device layer of the SOI wafer, wherein the device layer is a silicon layer positioned on the insulator film. Accordingly, a manufactured condition of the SOI wafer can effect on the thickness of the cantilever.

In other words, the thickness of the device layer of the SOI wafer has an error during manufacturing courses of the SOI wafer. Accordingly, if there is an error in the thickness of the device layer, the thickness of the cantilever of the probe has an error, too.

After all, it is required to fabricate a probe for use in a scanning probe microscope while using inexpensive general silicon wafer, wherein the probe has a high dimensional accuracy and a crystallographically large aspect ratio.

SUMMARY OF THE INVENTION

It is, therefore, an object of the present invention to provide a method for fabricating a probe of a crystallographically large aspect ratio for use in a scanning probe microscope by using a {111} general silicon wafer.

It is another object of the present invention to provide a method for fabricating an inexpensive probe having a high dimensional accuracy and a crystallographically large aspect ratio for use in a scanning probe microscope by using a general silicon wafer in lieu of an SOI silicon wafer.

In accordance with one aspect of the invention, there is provided a method of fabricating a probe tip for use in a scanning probe microscope, including the steps of: forming a triangular prism provided with a passivation film by patterning a {111} general silicon wafer, the passivation film being deposited on two sidewalls of the triangular prism; etching the silicon wafer to make the triangular prism into a probe tip of a triangular pyramid shape; and removing the passivation film.

In accordance with another aspect of the invention, there is provided a method of fabricating a probe, the probe having a probe tip, a cantilever and a probe body, for use in a scanning probe microscope, including the steps of: depositing a mask layer for defining a cantilever on a {111} general silicon wafer provided with a probe tip; etching the silicon wafer up to a predetermined depth by using the mask layer; removing the mask layer; depositing a passivation film entirely on an upper surface and a lower surface of the silicon wafer; forming a dummy pattern of the cantilever and the probe body on the lower surface of the silicon wafer; forming the cantilever by etching the dummy pattern of the cantilever; and removing the passivation film.

BRIEF DESCRIPTION OF THE DRAWINGS

The above and other objects and features of the present invention will become apparent from the following description of embodiments given in conjunction with the accompanying drawings, in which.

DETAILED DESCRIPTION OF THE EMBODIMENTS

Hereinafter, embodiments of the present invention will be described in detail with reference to the accompanying drawings. Here, it is to be noted that the present invention is not limited thereto.

Further, a term of "silicon wafer" represents a general single-crystalline silicon wafer except for an SOI wafer.

Figure 1:
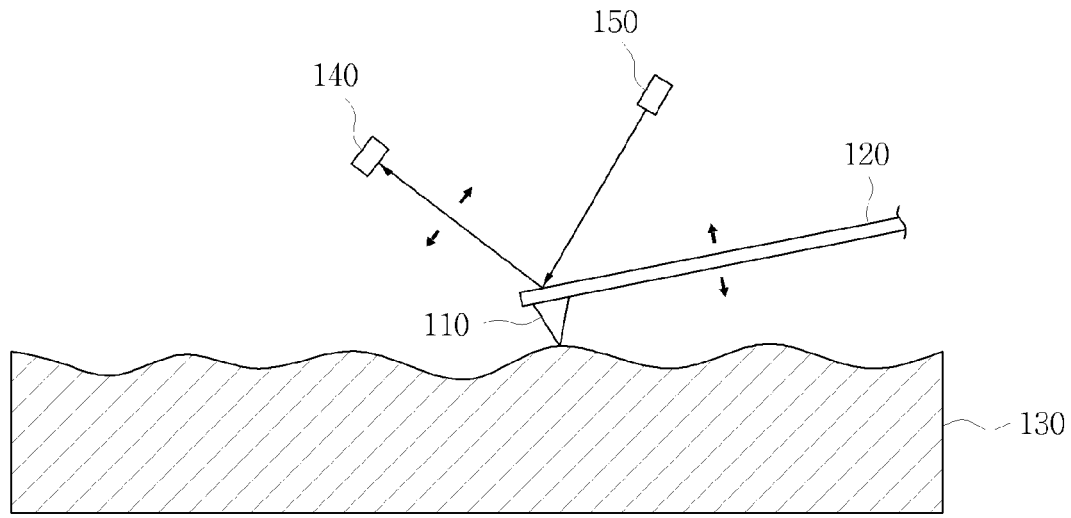
FIG. 1 is an example operation of a scanning probe microscope.
Figure 2A:
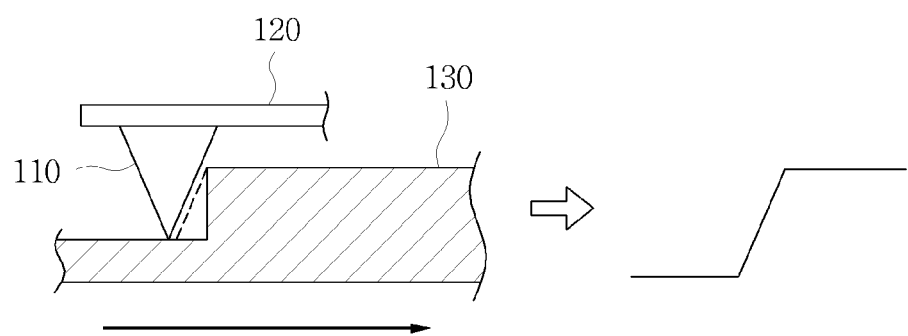
FIG. 2A sets forth an example diagram of a probe tip having a small aspect ratio.
Figure 2B:
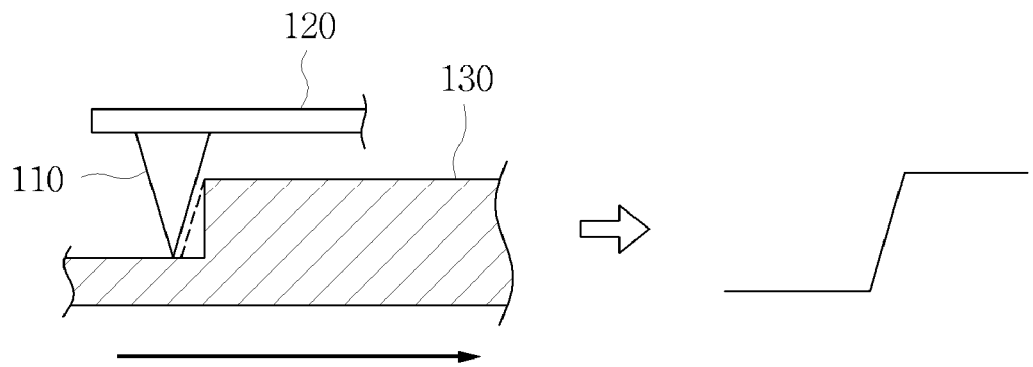
FIG. 2B shows an example diagram of a probe tip having a large aspect ratio.
Figure 3A:
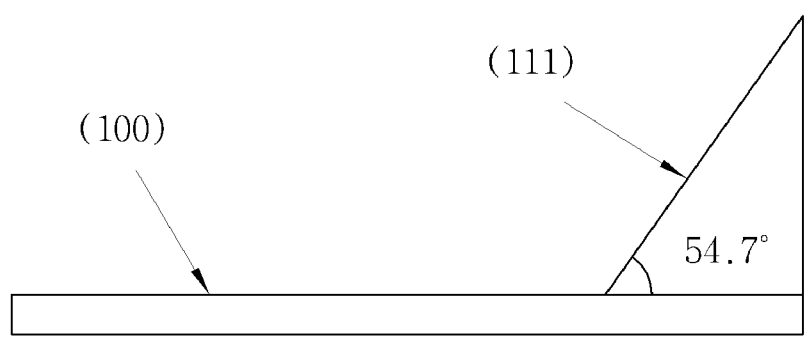
FIG. 3A presents a drawing of a probe tip fabricated by using a conventional {100} single-crystalline silicon.
Figure 3B:
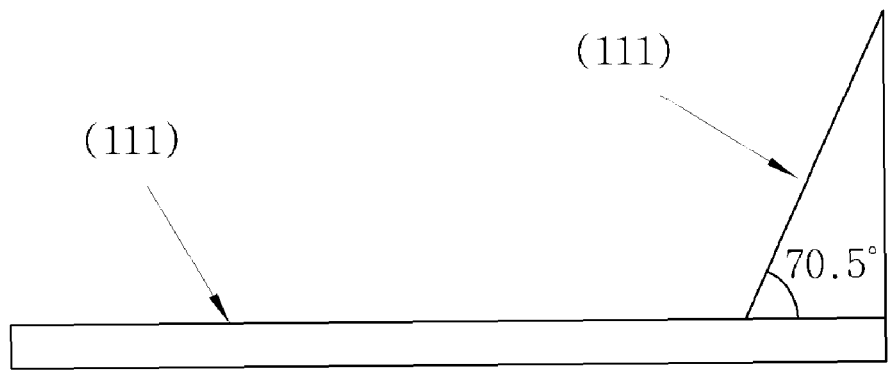
FIG. 3B is a drawing of a probe tip fabricated by using a {111} single-crystalline silicon.
Figure 3C:
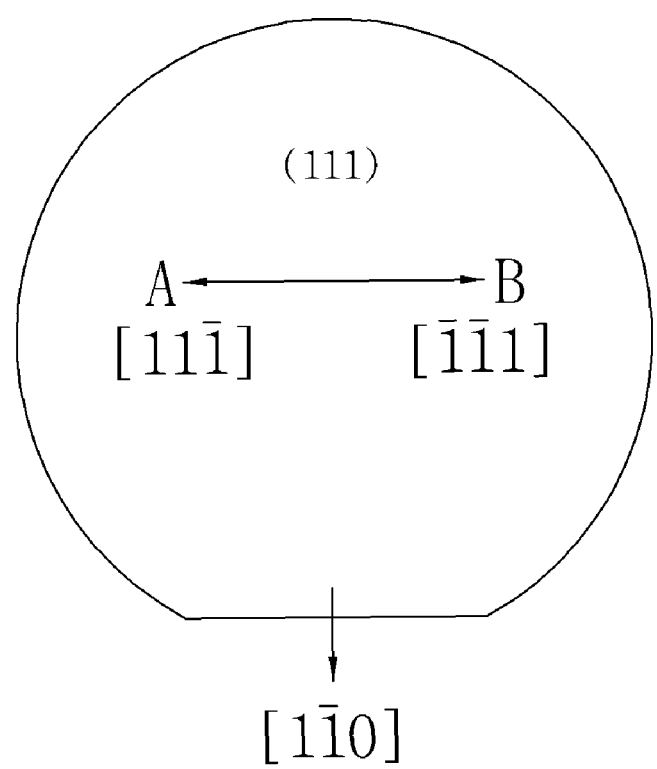
FIG. 3C provides a schematic diagram for showing a crystal orientation of the {111} silicon.
Figure 3D:
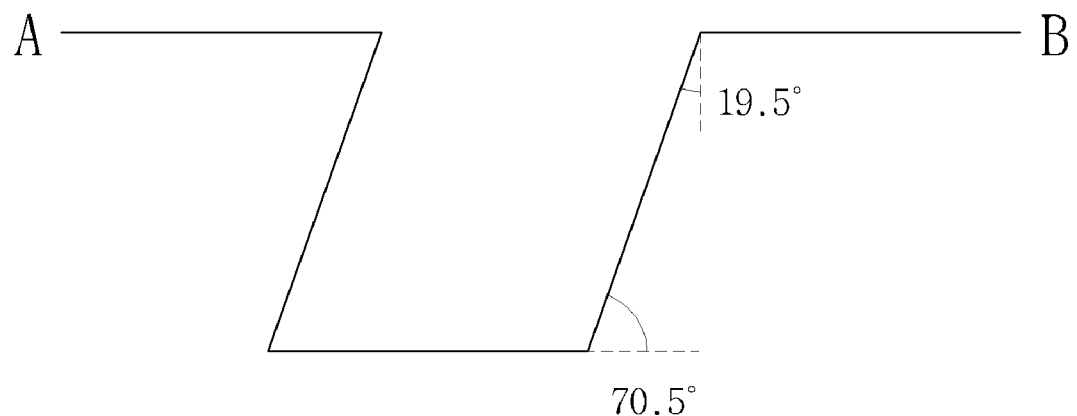
FIG. 3D is a cross sectional view of a crystal face taken along a line A-B of FIG. 3C.
Figure 4:
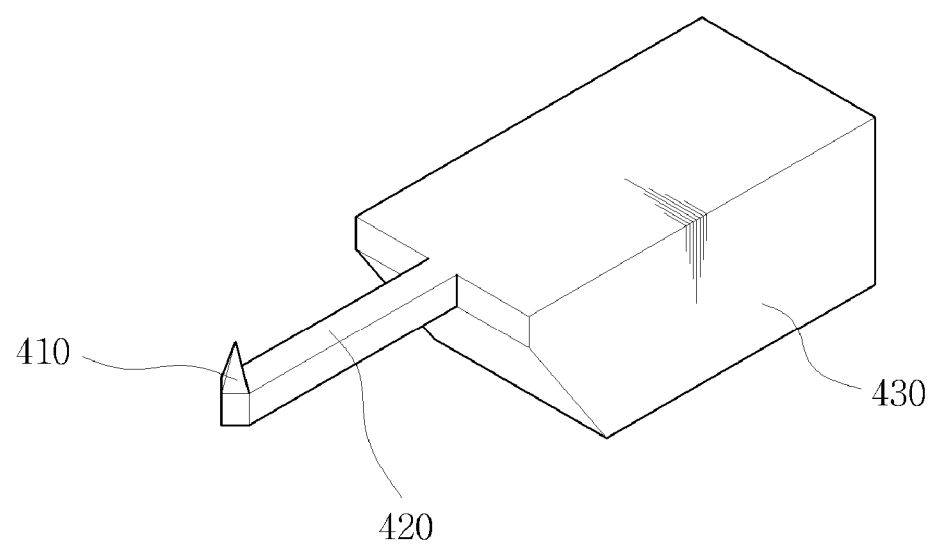
FIG. 4 illustrates a perspective view of a probe for use in a scanning probe microscope in accordance with an embodiment of the present invention.

FIG. 4 illustrates a perspective view of a probe for use in a scanning probe microscope in accordance with an embodiment of the present invention.

The probe illustrated in FIG. 4 includes a probe body 430, a cantilever 420 protrudingly formed at one surface of the probe body 430 and a probe tip 410 formed at one end of the cantilever 420.

First Embodiment

The method for fabricating a probe tip in accordance with a first embodiment of the present invention will be described in detail with reference to FIGS. 5A to 5I. FIGS. 5A to 5I represent drawings for showing a process of fabricating a probe tip in accordance with the first embodiment of the present invention.

Figure 5A:
FIGS. 5A to 5I are drawings for showing a process of fabricating a probe tip in accordance with a first embodiment of the present invention.
Figure 5A:
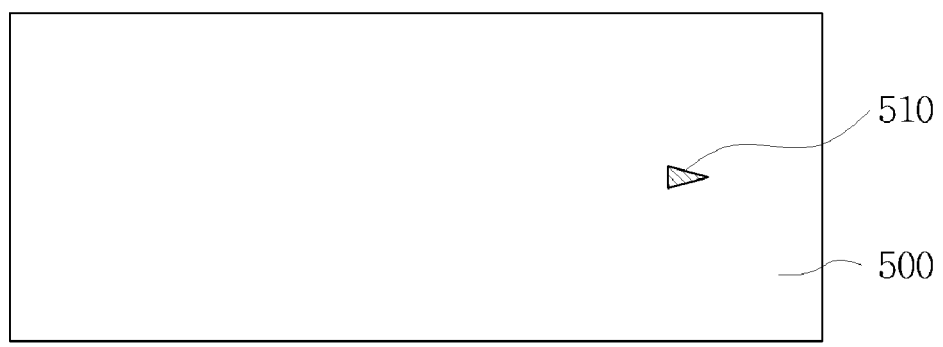

First, as shown in FIG. 5A, deposited on a {111} silicon wafer 500 is an oxide film 510 serving as a hard mask during a silicon dry etching process to be performed later.

The oxide film 510 defines a probe tip in accordance with the first embodiment of the present invention. As shown in FIG. 5A, the oxide film 510 has a triangular shape when it is seen from an upper surface of the silicon wafer 500. A thickness of the oxide film 510 should be thick enough to endure a deep silicon reactive ion etching (DRIE) process to be carried out later. For example, the thickness of the oxide film 510 is preferably 1 μm or more.

The oxide film 510 in FIG. 5A can be deposited by performing following processes, for example. That is, after a wet thermal oxide film is deposited in an atmosphere of $H_2O$ by using a chemical vapor deposition method, a photolithographic process is performed to define a portion of a probe tip to be formed later.

Next, after the oxide film 510 is patterned by using an oxide film dry etcher using plasma, residual of a photosensitive film is removed by using an $O_2$ plasma method or a mixed solution of sulfuric acid and hydrogen peroxide.

Figure 5B:
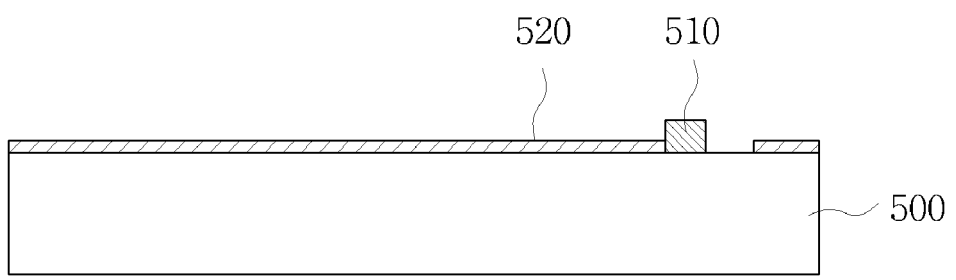
Figure 5B:
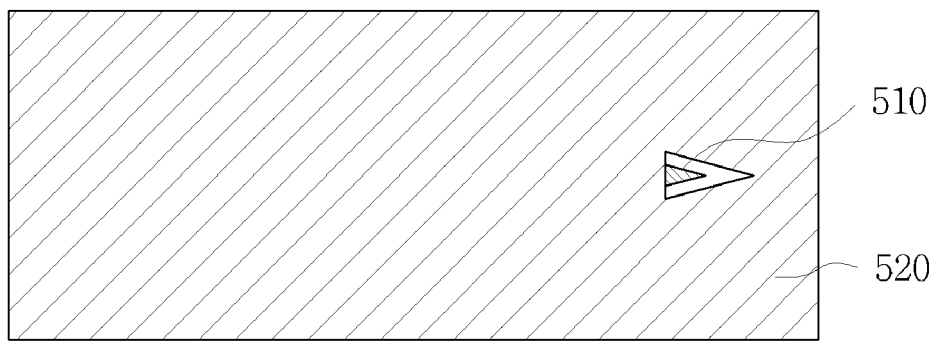

Referring to FIG. 5B, a photoresist layer 520 having a certain pattern is deposited on the silicon wafer 500. The photoresist layer 520 is patterned by the photolithographic process to remove a peripheral portion of two sides of the triangular oxide film 510.

Figure 5C:
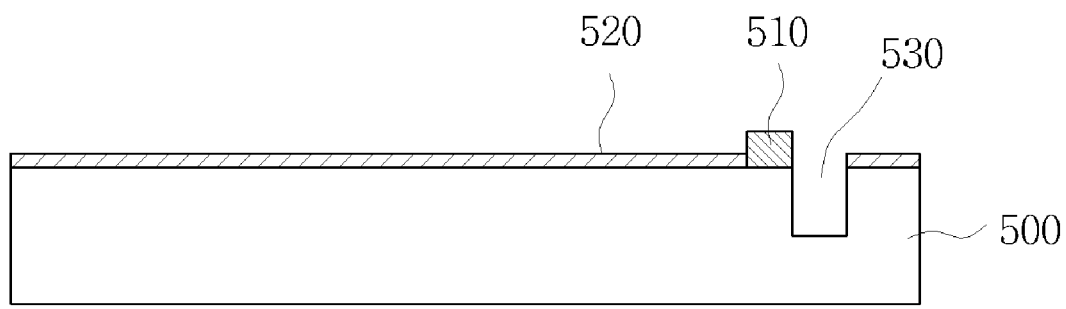

As shown in FIG. 5C, the silicon wafer 500 is etched by a wet etching process, e.g., DRIE process, using the already formed oxide film 510 and the photoresist layer 520 as a mask, thereby forming a trench 530.

The DRIE process can be performed as follows. That is, a polymer deposition step, a polymer etching step and a silicon etching step are sequentially performed for 5 seconds, 3 seconds and 5 seconds, respectively. Herein, the silicon etching step is carried out in an atmosphere of $SF_6$ gas.

Figure 5D:
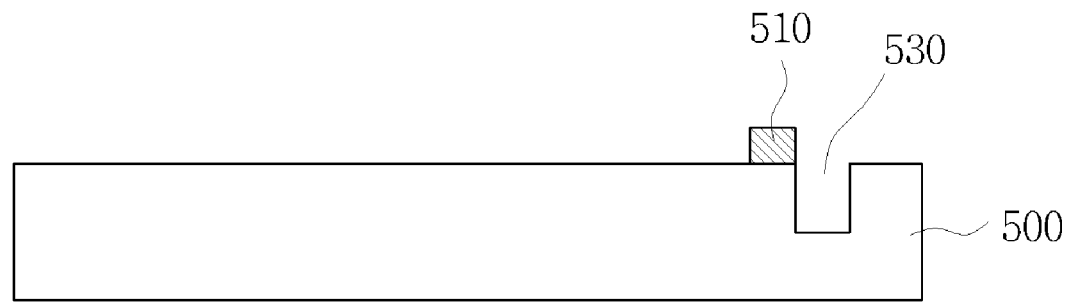

As illustrated in FIG. 5D, the photoresist layer 520 is removed. For example, the photoresist layer 520 can be removed by using $O_2$ plasma method or a mixed solution of sulfuric acid and hydrogen peroxide.

Figure 5E:
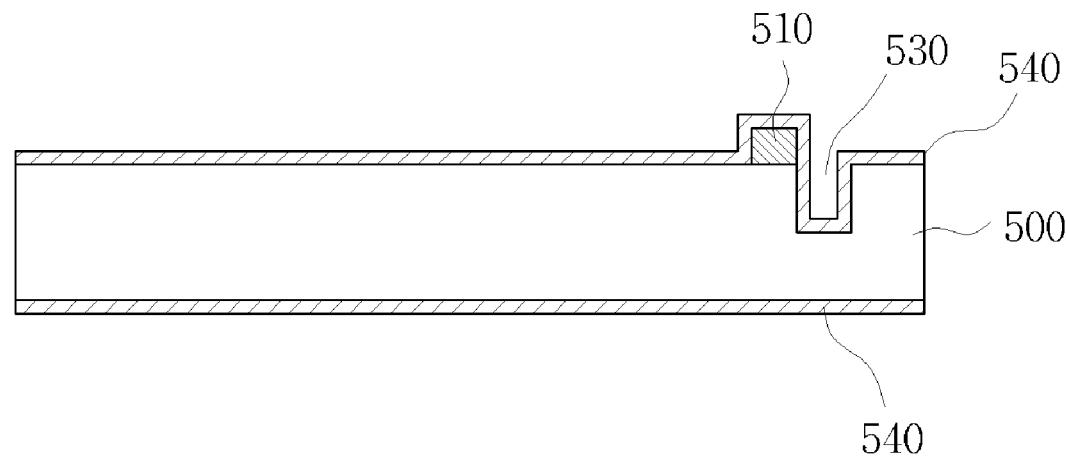

Referring to FIG. 5E, a passivation film 540 is deposited entirely on an upper surface and a lower surface of the silicon wafer 500. The passivation film 540 is deposited on sidewalls of the trench 530 as well as the silicon wafer 500 and the oxide film 510.

Especially, it is important that the passivation film 540 is deposited on two sidewalls of the trench 530, which are placed under two sides of the triangular oxide film 510. The passivation film 540 deposited on two sidewalls allows two sidewalls not to be etched during a wet etching process to be performed later. Herein, two sidewalls of the trench 530 will become two sidewalls of a probe tip to be formed later.

In this process, the passivation film 540 may be a wet thermal oxide film or a silicon nitride film. For example, the passivation film 540 may be formed by growing the wet thermal oxide film at 1000° C. in an atmosphere of $H_2O$.

Figure 5F:
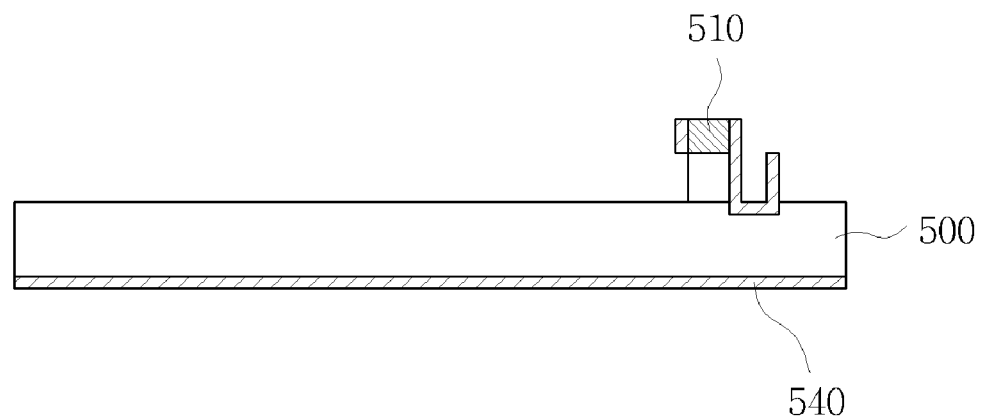

As shown in FIG. 5F, after the passivation film 540 on the upper surface of the silicon wafer 500 is removed by using the dry etching process, the silicon wafer 500 is vertically etched by the DRIE process using the oxide film 510 as a mask. Through this process, a triangular prism whose top surface is covered with the triangular oxide film 510 is formed on the silicon wafer 500.

Herein, the dry etching process for removing the passivation film 540 is performed by applying a bias on a plasma toward a silicon wafer direction in order not to etch the passivation film 540 formed on two sidewalls of the trench 530.

Figure 5G:
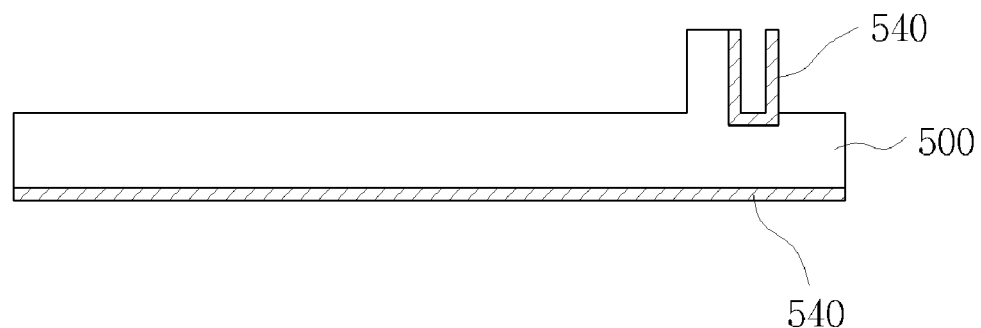

Referring to FIG. 5G, the oxide film 510 and the passivation film 540 formed on the side surfaces of the oxide film 510 are removed by carrying out the dry etching process.

Accordingly, the silicon wafer 500 is patterned through the above-described processes, thereby forming the triangular prism on the upper surface thereof, said two sidewalls of the triangular prism being provided with the passivation film 540.

Both of a top surface and a bottom surface of the triangular prism may be isosceles triangle. Further, it is satisfactory that the sidewalls of the triangular prism are substantially orthogonal to the bottom surface thereof.

Figure 5H:
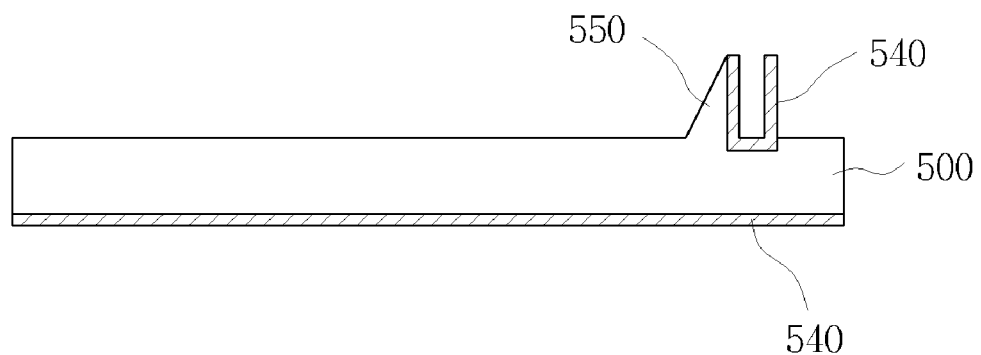

As illustrated in FIG. 5H, the silicon wafer 500 is etched through the wet etching process, thereby forming a probe tip 550. At this time, although an upper surface of a portion where a cantilever is to be formed is exposed to an etching solution, such upper surface is a {111} surface of a {111} single-crystalline silicon, and thus, an etching rate is slower than other surfaces thereof by 100 times or more.

On the other hand, in a portion where the probe tip 550 is formed, the etching is performed up to a {111} surface, i.e., an inclined surface in FIG. 5H, of the probe tip 550. Since two sidewalls of the triangular prism are provided with the passivation film 540, the triangular prism is etched from the other sidewall, where the passivation film 540 is not formed, toward the {111} surface of the probe tip 550.

The wet etching process can be performed by using a KOH solution or a tetramethyl ammonium hydroxide (TMAH) solution capable of etching silicon. That is, for example, the wet etching process can be carried out at 65° C. by using KOH (potassium hydroxide) solution of 44 wt %. Such condition is a solution condition of the lowest etching rate with respect to the {111} surface, and the wet etching process is performed for 20 to 25 minutes under such condition.

In addition, isopropyl alcohol can be added to the KOH solution used in the wet etching process in order to prevent hydrogen bubble from interrupting the etching process, the hydrogen bubble being generated in the wet etching process and remaining on a surface of an object to be etched.

Consequently, through the above-described processes, the triangular prism formed on the upper surface of the {111} silicon wafer 500 is etched to form the probe tip 550 of a triangular pyramid.

Figure 5I:

Finally, as shown in FIG. 5I, the probe tip 550 in accordance with the embodiment of the present invention can be fabricated by removing the remaining passivation film 540.

The passivation film 540 can be removed by using, e.g., buffered oxide etchant (BOE) solution or hydrofluoric acid (HF) solution.

Second Embodiment

The method for fabricating a probe tip in accordance with a second embodiment of the present invention will be described in detail with reference to FIGS. 6A to 6I. FIGS. 6A to 6I represent drawings for showing a process of fabricating a probe tip in accordance with the second embodiment of the present invention.

Figure 6A:
FIGS. 6A to 6I are drawings for showing a process of fabricating a probe tip in accordance with a second embodiment of the present invention.
Figure 6A:

First, as shown in FIG. 6A, deposited on a {111} silicon wafer 600 is an oxide film 610 serving as a hard mask during a silicon dry etching process to be performed later.

The oxide film 610 defines a probe tip in accordance with a second embodiment of the present invention. As shown in FIG. 6A, the oxide film 610 has a triangular shape when it is seen from an upper surface of the silicon wafer 600. A thickness of the oxide film 610 should be thick enough to endure a deep silicon reactive ion etching (DRIE) process to be carried out later. For example, the thickness of the oxide film 610 is preferably 1 μm or more.

Figure 6B:

As shown in FIG. 6B, the silicon wafer 600 is etched by a dry etching process, e.g., DRIE process, using the oxide film as a mask. Through this process, a triangular prism whose top surface is covered with the triangular oxide film 610 is formed on an upper surface of the silicon wafer 600.

The DRIE process can be performed as follows. That is, a polymer deposition step, a polymer etching step and a silicon etching step are sequentially performed for 5 seconds, 3 seconds and 5 seconds, respectively. Herein, the silicon etching step is carried out in an atmosphere of $SF_6$ gas.

Figure 6C:
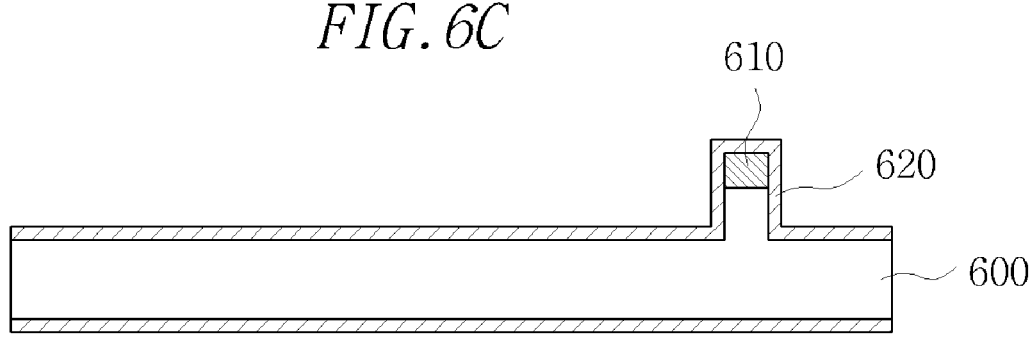

Referring to FIG. 6c, a passivation film 620 is deposited entirely on an upper surface and a lower surface of the silicon wafer 600. The passivation film 620 is deposited on three sidewalls of the triangular prism as well as the silicon wafer 600 and the oxide film 610. In this process, the passivation film 620 may be a wet thermal oxide film or a silicon nitride film. For example, the passivation film 620 is formed by growing the wet thermal oxide film at 1000° C. in an atmosphere of $H_2O$.

Figure 6D:
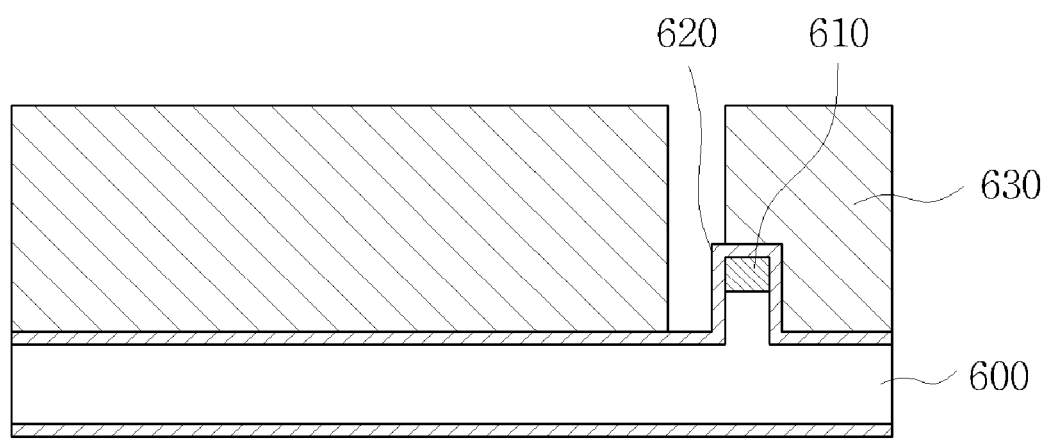

As illustrated in FIG. 6D, a thick photoresist layer 630 having a certain pattern is formed on the passivation film 620. The photoresist layer 630 is patterned by the photolithographic process to remove a peripheral portion of a side except for two sides of the triangle-shaped oxide film 610. The thickness of the photoresist layer 630 should be thick enough to entirely cover the triangular prism.

Figure 6E:
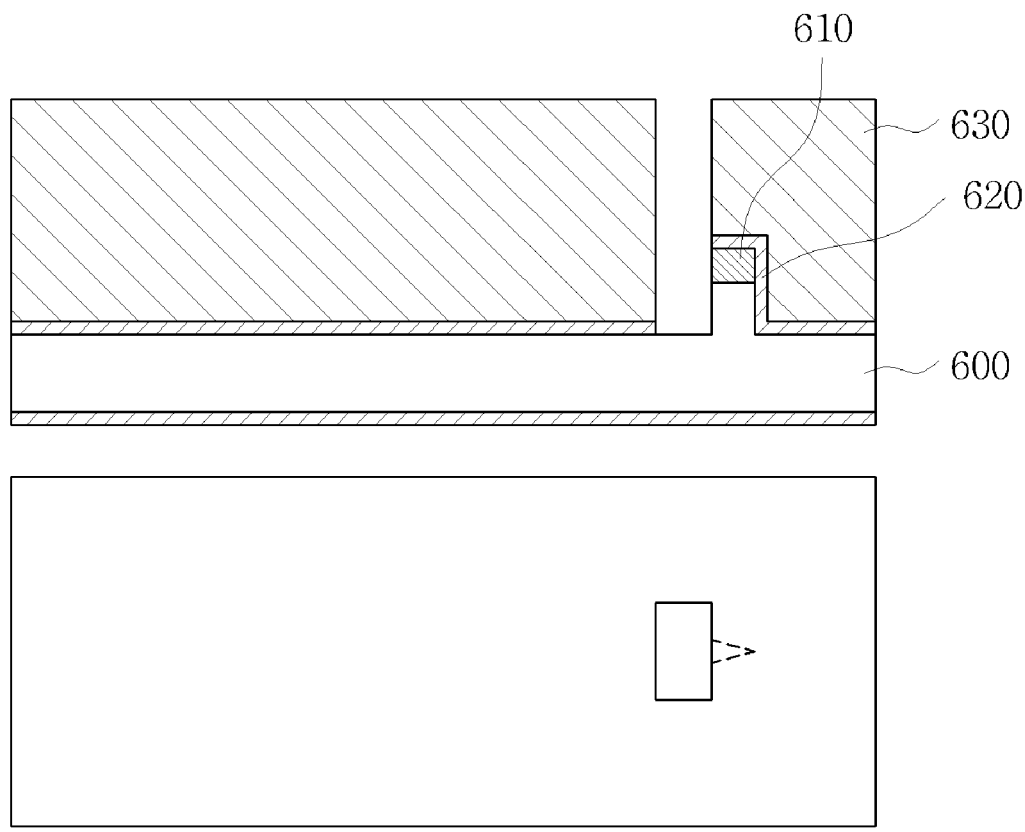

Next, in FIG. 6E, a portion of the passivation film 620, which has been exposed due to the pattern of the photoresist layer 630, is removed by a wet etching process using the photoresist layer 630 as a mask. Since this process is performed by using the wet etching process, both of the passivation film 620 on a sidewall of the triangular prism, the sidewall being provided under the one side of the triangle-shaped oxide film 610, and the passivation film 620 on the exposed silicon wafer 600 are etched. Herein, buffered oxide etchant (BOE) for affecting nothing on the photoresist layer 630 may be used in the wet etching process.

Figure 6F:
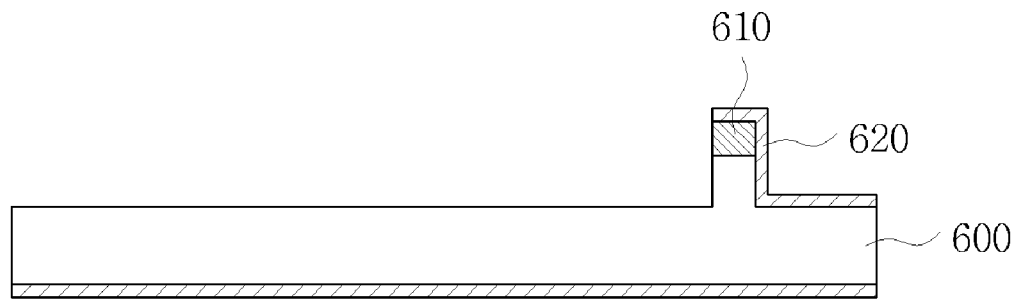

As shown in FIG. 6F, the photoresist layer 630 is removed. For example, the photoresist layer 630 can be removed by using an $O_2$ plasma method or a mixed solution of sulfuric acid and hydrogen peroxide.

Figure 6G:
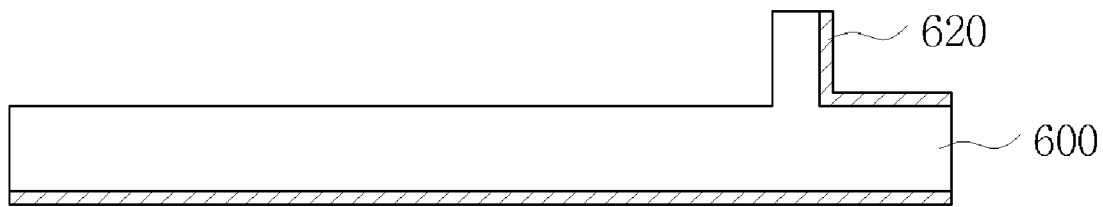

Referring to FIG. 6G, the passivation film 620 on the top surface and on the sides of the triangular oxide film 610, and the triangular oxide film 610 are removed by the dry etching process.

Accordingly, by patterning the {111} silicon wafer 600 through the above-described processes, the triangular prism is formed thereon and the passivation film is provided on two sidewalls thereof. Further, it is satisfactory that the sidewalls of the triangular prism are substantially orthogonal to the bottom surface thereof.

Figure 6H:
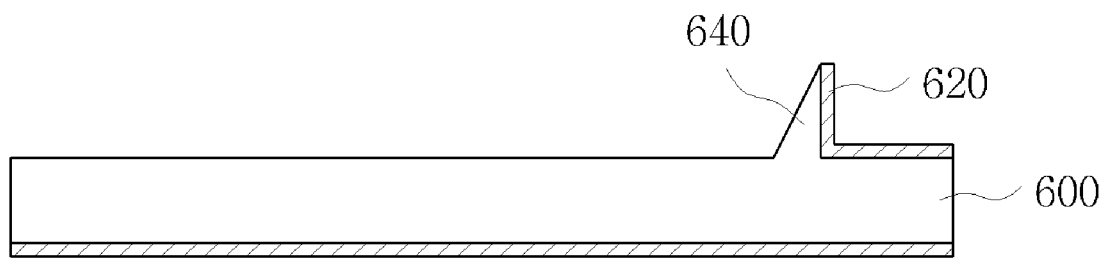

As illustrated in FIG. 6H, the silicon wafer 600 is etched through the wet etching process, thereby forming a probe tip 640. At this time, although an upper surface of a portion, where a cantilever is to be formed, of the silicon wafer 600 is exposed to an etching solution, such upper surface is a {111} surface of a {111} single-crystalline silicon, and thus, an etching rate is slower than other surfaces thereof by 100 times or more.

On the other hand, in a portion where the probe tip 640 is formed among the silicon wafer 600, the etching is performed up to a {111} surface, i.e., an inclined surface in FIG. 6H, of the probe tip 640. Since two sidewalls of the triangular prism are provided with the passivation film 620, the triangular prism is etched from the other sidewall, where the passivation film 620 is not formed, toward the {111} surface of the probe tip 640.

The wet etching process can be performed by using a KOH solution or a tetramethyl ammonium hydroxide (TMAH) solution capable of etching silicon. That is, for example, the wet etching process can be carried out at 65° C. by using KOH (potassium hydroxide) solution of 44 wt %. Such condition is a solution condition of the lowest etching rate with respect to the {111} surface, and the wet etching process is performed for 20 to 25 minutes under such condition.

In addition, isopropyl alcohol can be added to the KOH solution used in the wet etching process in order to prevent hydrogen bubble from interrupting the etching process, the hydrogen bubble being generated in the wet etching process and remaining on a surface of an object to be etched.

Consequently, through the above-described processes, the triangular prism formed on the upper surface of the {111} silicon wafer 600 is etched to form the probe tip 640 of a triangular pyramid.

Figure 6I:

Finally, as shown in FIG. 6I, the probe tip 640 in accordance with the second embodiment of the present invention can be fabricated by removing the remaining passivation film 620. The passivation film 620 is removed by using, e.g., buffered oxide etchant (BOE) solution or hydrofluoric acid (HF) solution.

Patterning of Cantilever and Probe Body

A method for fabricating a cantilever in accordance with an embodiment of the present invention will be described in detail with reference to FIGS. 7A to 7I. FIGS. 7A to 7I provide drawings for showing a process of fabricating a cantilever in accordance with the embodiment of the present invention.

Figure 7A:
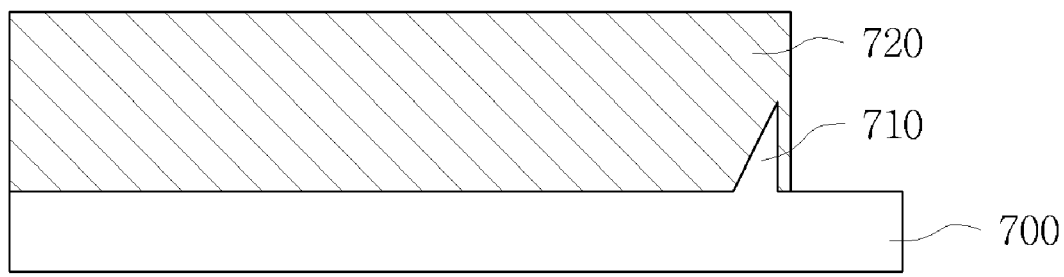
FIGS. 7A to 7I are drawings for showing a process of fabricating a cantilever in accordance with an embodiment of the present invention.

As shown in FIG. 7A, a photoresist layer 720 is deposited on a {111} silicon wafer 700 in order to cover a probe tip 710. The photoresist layer 720 is patterned to determine a width and a length of the cantilever. Further, the photoresist layer 720 is formed to have a thickness enough to protect the probe tip 710 during a DRIE process to be performed later.

Figure 7B:
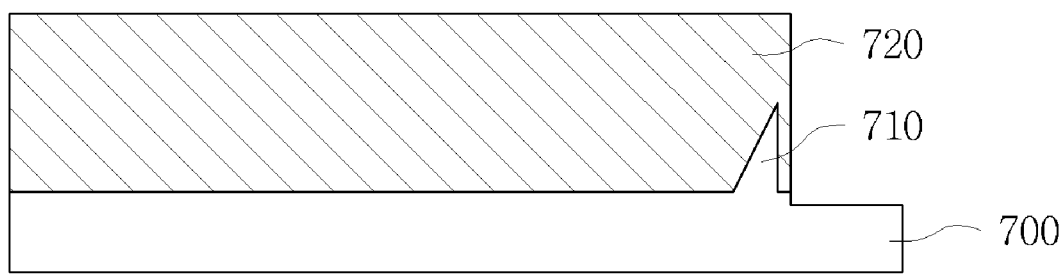

Referring to FIG. 7B, the silicon wafer 700 is etched by the DRIE process using the photoresist layer 720 as a mask. At this time, since an etching amount resulting from the DRIE process determines a thickness of the cantilever, the silicon wafer 700 is etched in consideration of a thickness of the cantilever by detecting a DRIE rate.

Figure 7C:
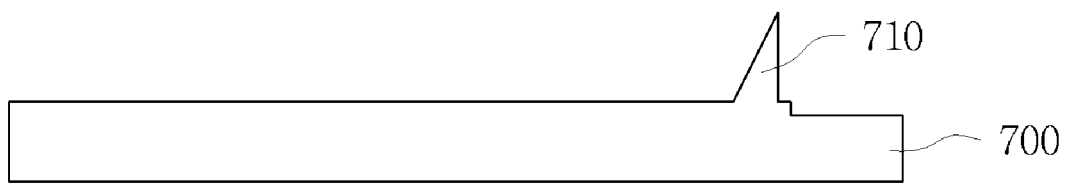

Next, as illustrated in FIG. 7C, the photoresist layer 720 is removed. For example, the photoresist layer 720 can be removed by using an $O_2$ plasma method or a mixed solution of sulfuric acid and hydrogen peroxide.

Figure 7D:
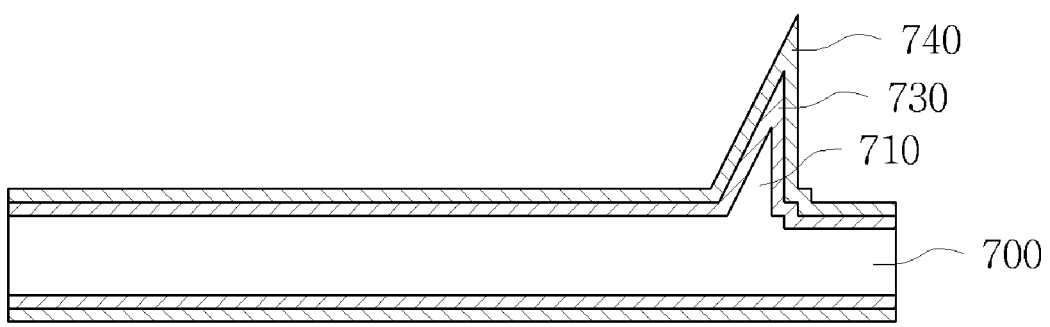

In FIG. 7D, a passivation film 730 is deposited entirely on an upper surface and a lower surface of the silicon wafer 700. The passivation film 730 can be formed of a wet thermal oxide film or a silicon nitride film. For example, it is formed by growing the wet thermal oxide film at 1000° C. in an atmosphere of $H_2O$. Further, since silicon oxidation can sharpen an end portion of the probe tip, a silicon nitride film can be additionally formed on the wet thermal oxide film as the passivation film 740 after forming the wet thermal oxide film.

Figure 7E:
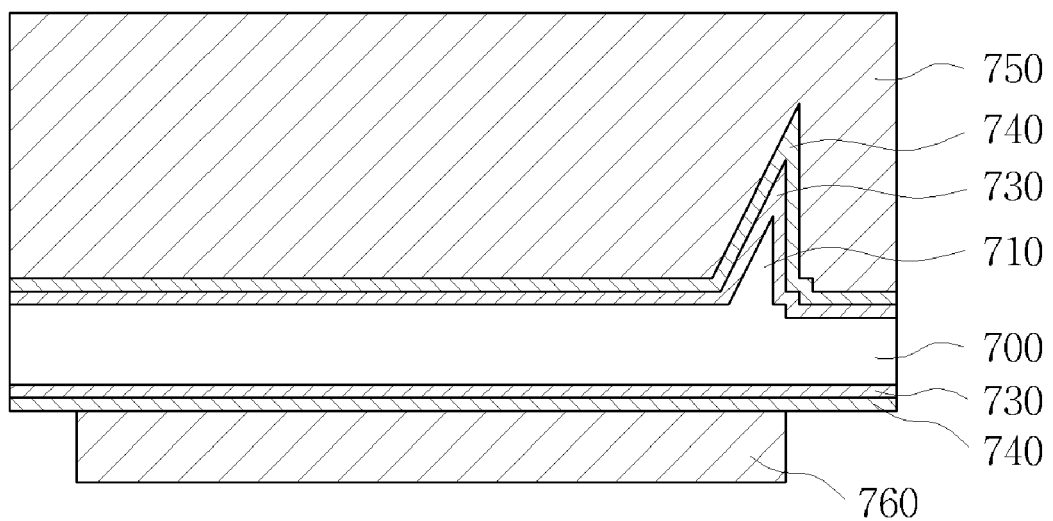

In FIG. 7E, a photoresist layer 750 is formed on the passivation film 740 on an upper side of the silicon wafer 700. Further, a photoresist layer 760 having a certain pattern is formed on the passivation film 740 on a lower side of the silicon wafer 700.

Figure 7F:
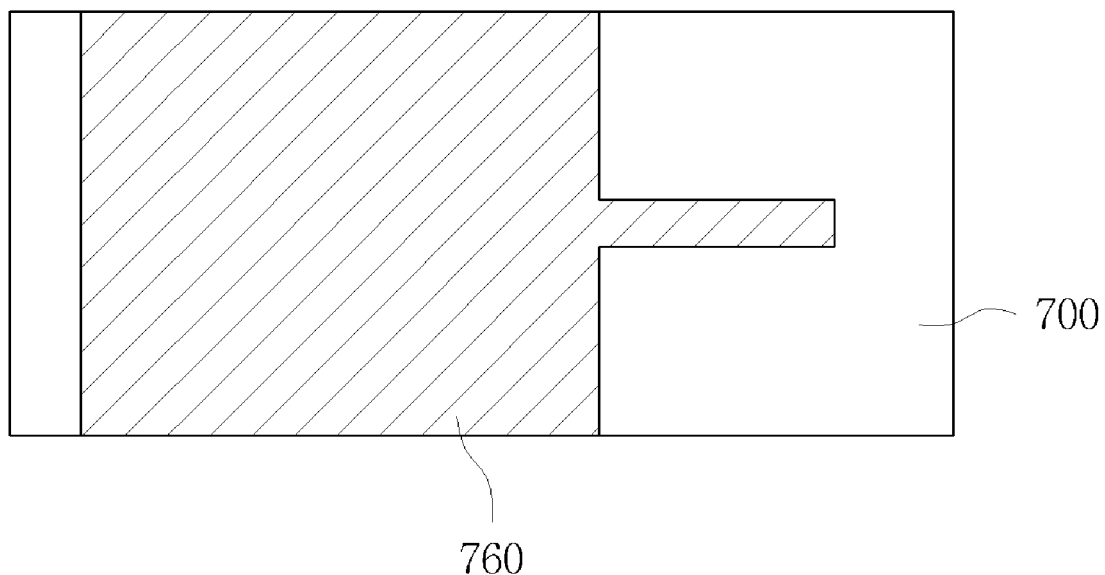

FIG. 7F offers a plane view of the silicon wafer 700 on which the photoresist layer 760 is formed when seen from the lower side thereof. As shown in FIG. 7F, the photoresist layer 760 is provided to define a probe body, and further, a dummy pattern is patterned to define a cantilever to be etched by the wet etching process to be performed later.

Figure 7G:
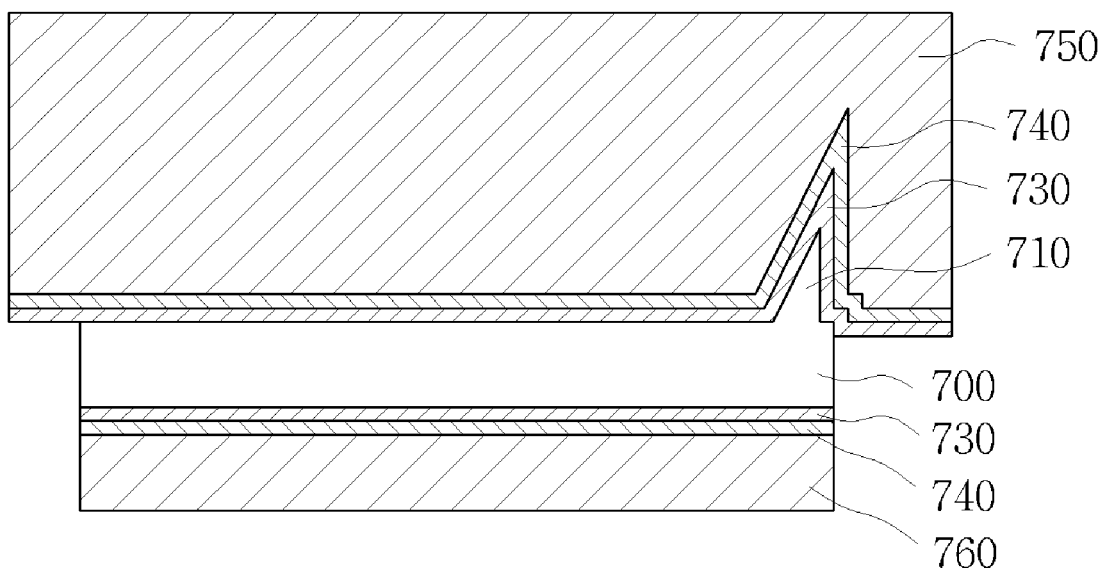

Next, in FIG. 7G, the silicon wafer 700 is etched by the DRIE process using the photoresist layers 750 and 760 as a mask. As results of this process, the probe body is formed, and further, the dummy pattern of the cantilever is formed at the lower side thereof.

Figure 7H:
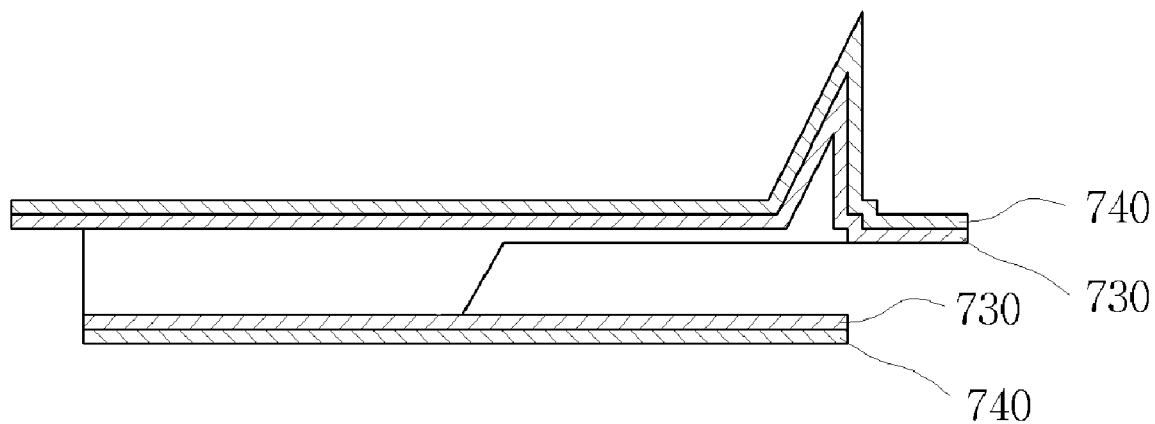

Referring to FIG. 7H, the cantilever is formed by etching the dummy pattern of the cantilever through the wet etching process. Herein, the passivation films 730 and 740 are formed on the lower surface of the dummy pattern, but the passivation films 730 and 740 are not formed on both sides of the dummy pattern.

Accordingly, it becomes etched from both sides of the dummy pattern toward a central portion thereof, which results in removing the entire of the dummy pattern. In other words, since a {111} silicon wafer 700 is difficult to be etched toward a {111} direction by the wet etching process, the etching process is performed in other direction except for the {111} direction, i.e., from both sides of the dummy pattern toward the central portion thereof, thereby exposing the base of the cantilever corresponding to a {111} surface.

Figure 7I:
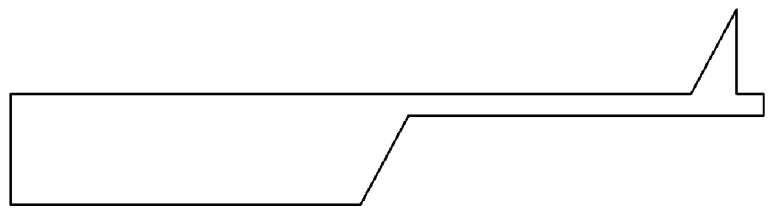

As shown in FIG. 7I, if the passivation film 730 and 740 are removed, the probe in accordance with the embodiment of the present invention is finally fabricated. The passivation film 730 of the oxide film can be removed by the wet etching process using, e.g., buffered oxide etchant (BOE) solution or hydrofluoric acid (HF) solution. Further, the passivation film 740 of the silicon nitride film can be removed by the wet etching process using, e.g., buffered oxide etchant (BOE) solution, hydrofluoric acid (HF) solution or phosphoric acid ($H_3PO_4$) solution.

Moreover, in accordance with the embodiment of the present invention, the probe body has an inclined surface having an angle identical to the inclined surface of the probe tip. Such inclined surface is a surface corresponding to the {111} surface of the {111} silicon wafer and a crystal face exposed when removing the dummy pattern of the cantilever by the wet etching process.

Moreover, such inclined surface allows the probe body not to prevent a laser beam irradiated by a light source from reaching on the cantilever of the probe during the operation of the scanning probe microscope.

Therefore, in accordance with the embodiment of the present invention, a probe of a crystallographically large aspect ratio for use in a scanning probe microscope can be fabricated by using a {111} silicon wafer.

Further, an inexpensive probe having a high dimensional accuracy and a crystallographically large aspect ratio for use in a scanning probe microscope can be fabricated by using a silicon wafer instead of an SOI silicon wafer.

While the invention has been shown and described with respect to the embodiments of the present invention, it will be understood by those skilled in the art that various changes and modifications may be made without departing from the spirit and scope of the invention as defined in the following claims.

What is claimed is:

1. A method of fabricating a probe tip for use in a scanning probe microscope, comprising the steps of:
    (a) forming a triangular prism provided with a passivation film by patterning a {111} general silicon wafer, the passivation film being deposited on two sidewalls of the triangular prism;
    (b) etching the silicon wafer to make the triangular prism into a probe tip of a triangular pyramid shape; and
    (c) removing the passivation film,
    wherein the step (a) includes the steps of:
    (a-1) depositing a triangular mask layer on the silicon wafer;
    (a-2) forming a trench in a peripheral portion of two sides of the triangular mask layer;
    (a-3) depositing the passivation film entirely on the triangular mask layer and the trench and an upper surface and a lower surface of the silicon wafer;
    (a-4) removing the passivation film on the upper surface of the silicon wafer;
    (a-5) etching the silicon wafer to form a triangular prism by using the mask layer as a pattern; and
    (a-6) removing the mask layer and the passivation film formed on the side surfaces of the mask layer.

2. The method of claim 1, wherein the mask layer is an oxide film and the passivation film is a silicon oxide film or a silicon nitride film.

3. The method of claim 1, wherein the step (b) is performed by a wet etching process and the step (a-5) is performed by a deep silicon reactive ion etching (DRIE) process.

4. A method of fabricating a probe tip for use in a scanning probe microscope, comprising the steps of:
    (a) forming a triangular prism provided with a passivation film by patterning a {111} general silicon wafer, the passivation film being deposited on two sidewalls of the triangular prism;
    (b) etching the silicon wafer to make the triangular prism into a probe tip of a triangular pyramid shape; and
    (c) removing the passivation film,
    wherein the step (a) includes the steps of:
    (a-7) forming a first triangular mask layer on the silicon wafer;
    (a-8) etching the silicon wafer to form the triangular prism by using the first mask layer as a pattern;
    (a-9) depositing a passivation film entirely on an upper surface and a lower surface of the triangular prism;
    (a-10) forming a second mask layer on the passivation film in order to expose one sidewall of the triangular prism;
    (a-11) removing the passivation film on said one sidewall of the triangular prism by using the second mask layer; and
    (a-12) removing the second mask layer, the passivation film one the first mask layer and the upper surface and the side surfaces of the first mask layer.

5. The method of claim 4, wherein the first mask layer is a silicon oxide film; the second mask layer is a photoresist layer; and the passivation film is a silicon oxide film or a silicon nitride film.

6. The method of claim 4, wherein the step (b) is performed by a wet etching process and the step (a-8) is performed by a deep silicon reactive ion etching (DRIE) process.

7. A method of fabricating a probe, the probe having a probe tip, a cantilever and a probe body, for use in a scanning probe microscope, comprising the steps of:
    (a) depositing a mask layer for defining a cantilever on a {111} general silicon wafer provided with a probe tip;
    (b) etching the silicon wafer up to a predetermined depth by using the mask layer;
    (c) removing the mask layer;
    (d) depositing a passivation film entirely on an upper surface and a lower surface of the silicon wafer;
    (e) forming a dummy pattern of the cantilever and the probe body on the lower surface of the silicon wafer;
    (f) forming the cantilever by etching the dummy pattern of the cantilever; and
    (g) removing the passivation film.

8. The method of claim 7, wherein the passivation film is a silicon oxide film or a silicon nitride film.

9. The method of claim 7, further comprising the steps of:
    forming an additional passivation film after the step (d); and
    removing the additional passivation film after the step (g).

10. The method of claim 9, wherein the passivation film is a silicon oxide film and the additional passivation film is a silicon nitride film.

11. The method of claim 7, wherein the step (e) is carried out by etching the silicon wafer by a deep silicon reactive ion etching (DRIE) process after forming a dummy pattern of the cantilever and a photoresist layer for defining the probe body on the lower surface of the silicon wafer.

12. The method of claim 7, the step (b) is performed by the DRIE process and the step (f) is performed by the wet etching process.

13. The method of claim 7, wherein the probe tip is fabricated according to a method comprising the steps of:
    (a) forming a triangular prism provided with a passivation film by patterning a {111} general silicon wafer, the passivation film being deposited on two sidewalls of the triangular prism;
    (b) etching the silicon wafer to make the triangular prism into a probe tip of a triangular pyramid shape; and
    (c) removing the passivation file,
    wherein the step (a) includes the steps of:
    (a-1) depositing a triangular mask layer on the silicon wafer;
    (a-2) forming a trench in a peripheral portion of two sides of the triangular mask layer;
    (a-3) depositing the passivation film entirely on the triangular mask layer and the trench and an upper surface and a lower surface of the silicon wafer;
    (a-4) removing the passivation film on the upper surface of the silicon wafer;
    (a-5) etching the silicon wafer to form a triangular prism by using the mask layer as a pattern; and
    (a-6) removing the mask layer and the passivation film formed on the side surfaces of the mask layer.

14. The method of claim 7, wherein the probe tip is fabricated according to a method comprising the steps of:

(a) forming a triangular prism provided with a passivation film by patterning a {111} general silicon wafer, the passivation film being deposited on two sidewalls of the triangular prism;
(b) etching the silicon wafer to make the triangular prism into a probe tip of a triangular pyramid shape; and
(c) removing the passivation file,
wherein the step (a) includes the steps of:
(a-7) forming a first triangular mask layer on the silicon wafer;
(a-8) etching the silicon wafer to form the triangular prism by using the first mask layer as a pattern;
(a-9) depositing a passivation film entirely on an upper surface and a lower surface of the triangular prism;
(a-10) forming a second mask layer on the passivation film in order to expose one sidewall of the triangular prism;
(a-11) removing the passivation film on said one sidewall of the triangular prism by using the second mask layer; and
(a-12) removing the second mask layer, the passivation film one the first mask layer and the upper surface and the side surfaces of the first mask layer.

* * * * *